United States Patent
Wu (10) Patent No.: US 9,119,252 B2
(45) Date of Patent: Aug. 25, 2015

(54) LIGHTING DEVICE ADAPTED FOR SYNCHRONOUS CONTROL

(71) Applicant: HARK GROUP HOLDING CORP., Belize (BZ)

(72) Inventor: Chao-Li Wu, Taipei (TW)

(73) Assignee: HARK GROUP HOLDING CORP., Belize (BZ)

( * ) Notice: Subject to any disclaimer, the term of this patent is extended or adjusted under 35 U.S.C. 154(b) by 0 days.

(21) Appl. No.: 14/285,820

(22) Filed: May 23, 2014

(65) Prior Publication Data

US 2014/0346966 A1    Nov. 27, 2014

(30) Foreign Application Priority Data

May 24, 2013   (TW) .............................. 102209705 U (51) Int. Cl.
| | |
|---|---|
| H05B 37/00 | (2006.01) |
| H05B 39/00 | (2006.01) |
| H05B 41/14 | (2006.01) |
| H05B 41/392 | (2006.01) |
| G05F 1/455 | (2006.01) |
| H05B 33/08 | (2006.01) |

(52) U.S. Cl.
CPC ........ *H05B 33/0815* (2013.01); *H05B 41/3924* (2013.01); *G05F 1/455* (2013.01)

(58) Field of Classification Search
CPC .. H05B 37/029; H05B 41/34; H05B 41/3924; B23K 11/248; H02M 1/02; G05F 1/455
USPC ................................... 315/201, 200, 205, 208
See application file for complete search history.

(56) References Cited

U.S. PATENT DOCUMENTS

| | | | |
|---|---|---|---|
| 2009/0206769 A1* | 8/2009 | Biery et al. | 315/291 |
| 2011/0133655 A1* | 6/2011 | Recker et al. | 315/159 |
| 2012/0286689 A1* | 11/2012 | Newman et al. | 315/246 |

* cited by examiner

*Primary Examiner* — Dylan White
(74) *Attorney, Agent, or Firm* — WPAT, PC; Justin King (57) ABSTRACT

A light body includes a counting and control unit which counts a switching number of a switch element, and outputs a corresponding enable signal to a driving and light-emitting module to emit light of a selected feature according to the switching number of the switch element. The light body further includes a bridge current rectifying unit in communication with the switch element for converting alternating current received from the power source into direct current. For allowing two or more light bodies to be synchronously controlled, the switching signal indicative of the counted switching number is substantially simultaneously transmitted to the counting and control unit of each of the light bodies without passing through the bridge current rectifying unit.

21 Claims, 9 Drawing Sheets

LIGHTING DEVICE ADAPTED FOR SYNCHRONOUS CONTROL

FIELD OF THE INVENTION

The present invention relates to a lighting device, and more particularly to a lighting device whose functions are selectable according to a switching number of a switch element.

BACKGROUND OF THE INVENTION

Figure 1:
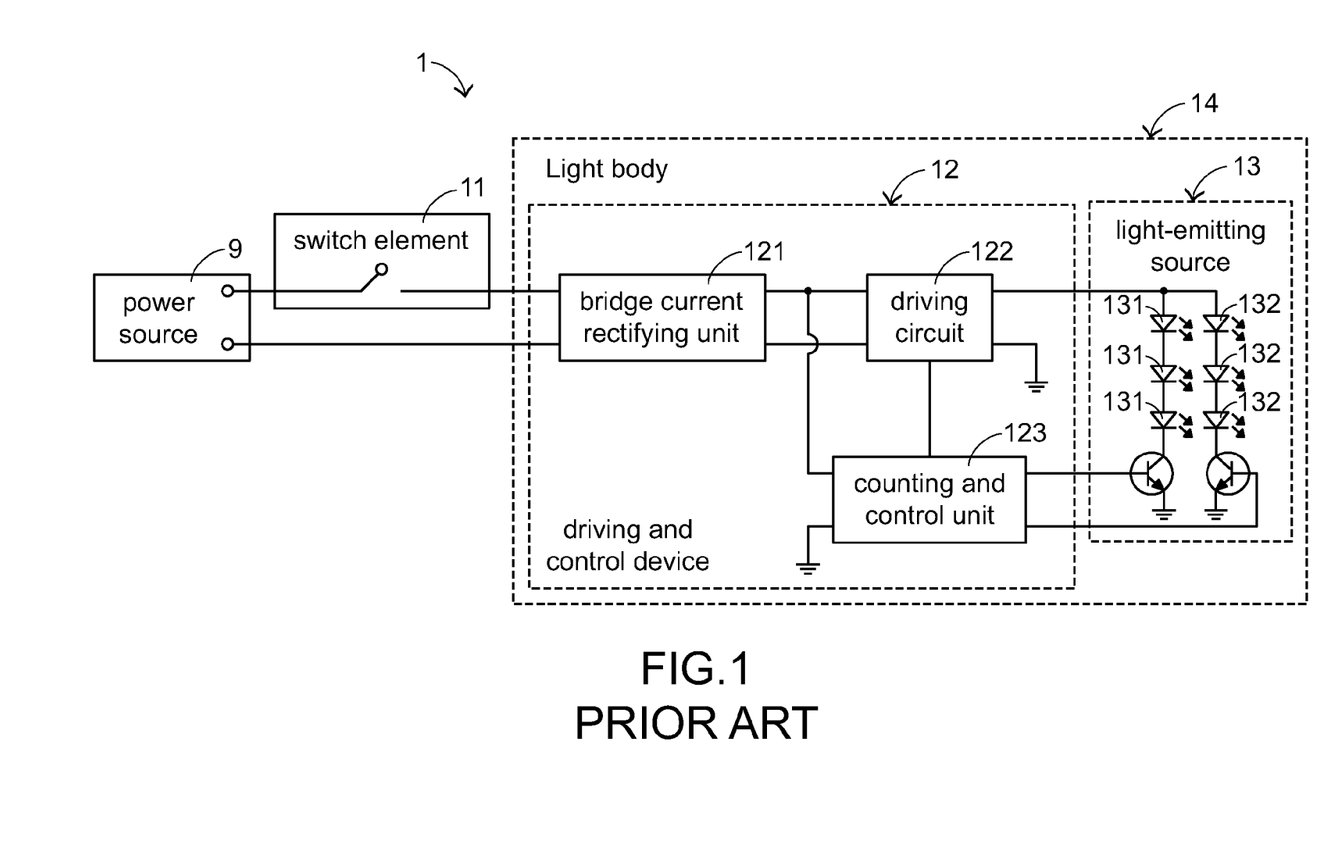
FIG. 1 is a circuit block diagram schematically illustrating a lighting device whose color temperature is adjustable and controllable.

Please refer to FIG. 1, which is a circuit block diagram schematically illustrating a lighting device according to prior art. The color temperature of the lighting device 1 is adjustable and controllable. The lighting device 1 includes a switch element 11, a driving and control device 12 and a light-emitting source 13. The driving and control device 12 includes a bridge current rectifying unit 121, a driving circuit 122 and a counting and control unit 123. The light-emitting source 13 includes a first light emitting diode (LED) unit 131 emitting a light of a first color temperature and a second light emitting diode (LED) unit 132 emitting a light of a second color temperature. The switch element 11, for example, can be mounted on the wall, while the driving and control device 12 and the light-emitting source 13 can be disposed in a light body 14.

The switch element 11 is coupled to a power source 9, e.g. mains electricity, and the bridge current rectifying unit 121. The bridge current rectifying unit 121 converts the alternating current into direct current. The counting and control unit 123 is electrically connected to the bridge current rectifying unit 121, the driving circuit 122 and the light-emitting source 13, counting a switching number of the switch element 11, which is turned on for receiving the direct current from the light-emitting source 13, and outputting an enable signal accordingly. The driving circuit 122 drives the first LED unit 131 to emit the light of the first color temperature and/or drives the second LED unit 132 to emit the light of the second color temperature. The details of the operational principle are disclosed in Taiwanese Patent Publication No. M392923, and are not to be redundantly described herein.

Unfortunately, it is found that the above-described architecture could not be applied to a lighting device with more than one light body due to the synchronous control problem.

Figure 2:
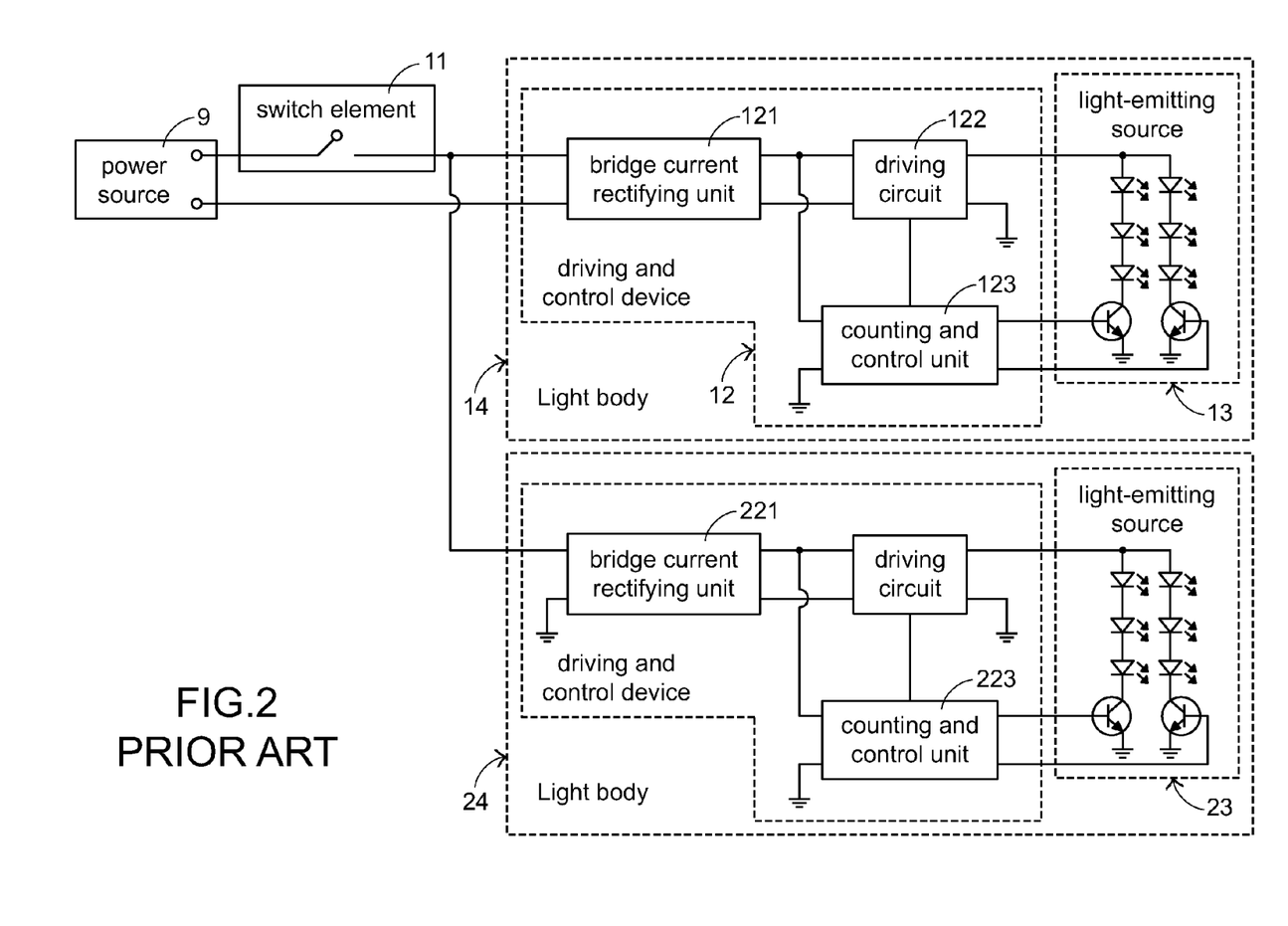
FIG. 2 is a circuit block diagram schematically illustrating a lighting device with two light bodies.

For explanation in more detail, please refer to FIG. 2, which is a circuit block diagram schematically illustrating a light device with two light bodies 14 and 24. Similar to the lighting device shown in FIG. 1, respective light-emitting sources 13 and 23 of the light bodies 14 and 24 emit light of corresponding color temperatures according to the switching number of the switch element 11. However, since the electronic elements, e.g. capacitors, included in the two lighting bodies for the same functions may still differ in specifications or suffer from manufacturing deviations, the time taken for alternating current to enter the lighting body 14, be converted into direct current by the bridge current rectifying unit 121 and trigger the counting and control unit 123 to count and the time taken for alternating current to enter the lighting body 24, be converted into direct current by the bridge current rectifying unit 221 and trigger the counting and control unit 223 may be inconsistent. As a result, the light emission of the light-emitting source 13 of the light body 14 may desynchronize with the light emission of the light-emitting source 23 of the light body 24. For example, light could be emitted or extinguished at different time points for different lighting bodies.

Therefore, there is a need to improve such a light device.

SUMMARY OF THE INVENTION

An object of the present invention is to provide a lighting device under precise synchronization control.

In an aspect, the present invention provides lighting device, which comprises:
 a switch element coupled to a power source;
 a bridge current rectifying unit in communication with the switch element for converting alternating current received from the power source into direct current;
 a driving and light-emitting module in communication with the bridge current rectifying unit; and
 a counting and control unit in communication with the switch element and the driving and light-emitting module for counting a switching number of the switch element, and selectively outputting one or both of a first enable signal and a second enable signal to the driving and light-emitting module to execute a corresponding function according to the switching number of the switch element.

In an embodiment, the counting and control unit is a programmable microcontroller or a flip-flop.

In an embodiment, the counting and control unit starts over the counting of the switching number of the switch element once the switch element is in an off state for a time period longer than a preset time period.

In an embodiment, the counting and control unit includes a capacitor for power supply to the counting and control unit during the preset time period.

In an embodiment, the driving and light-emitting module includes a driving circuit; a first LED unit coupled to and driven by the driving circuit for emitting a light of a first color temperature in response to the first enable signal; and a second LED unit coupled to and driven by the driving circuit for emitting a light of a second color temperature in response to the second enable signal.

Alternatively, the driving and light-emitting module includes a driving circuit; and an LED unit coupled to and driven by the driving circuit for emitting a light of a first luminance in response to the first enable signal, and emitting a light of a second luminance in response to the second enable signal.

In an embodiment, the lighting device further comprises a modulating module coupled to the driving and light-emitting module for fine-tuning luminance of the emitted light. In an embodiment, the modulating module includes a variable resistor and the luminance is changed with resistance of the variable resistor.

In an embodiment, the modulating module further includes a knob coupled to the variable resistor and rotatable to change the resistance of the variable resistor.

In another aspect of the present invention, the lighting device comprises:
 a light-emitting source for providing an illumination light;
 a switch element coupled to a power source; and
 a driving and control device in communication with the switch element and the light-emitting source for counting a switching number of the switch element, and selectively outputting one or both of a first enable signal and a second enable signal to the driving and light-emitting module to execute a corresponding function according to the switching number of the switch element.

In an embodiment, the driving and control device includes a bridge current rectifying unit in communication with the switch element for converting alternating current received from the power source into direct current to be transmitted to the driving and control device.

In an embodiment, the driving and control device includes a driving circuit in communication with the light-emitting source; and a counting and control unit in communication with the switch element and the driving circuit for counting the switching number of the switch element, and selectively outputting one or both of the first enable signal and the second enable signal to the driving and light-emitting module to execute the corresponding function according to the switching number of the switch element.

In a further aspect, the present invention provides a lighting device, which comprises:

a bridge current rectifying unit in communication with a mains switch for converting alternating current from a power source into direct current;

a driving and light-emitting module in communication with the bridge current rectifying unit; and a counting and control unit in communication with the mains switch and the driving and light-emitting module for counting a switching number of the mains switch, and selectively outputting one or both of a first enable signal and a second enable signal to the driving and light-emitting module to execute a corresponding function according to the switching number of the switch element.

In an embodiment, the counting and control unit selects to output the first enable signal and/or the second enable signal according to a switching-on number of the mains switch, which is realized by counting an alternating-current receiving number from the power source.

In an embodiment, the counting and control unit starts over the counting of the switching-on number of the mains switch once the mains switch is in an off state for a time period longer than a preset time period, and the counting and control unit includes a capacitor for power supply to the counting and control unit during the preset time period.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENT

Figure 3:
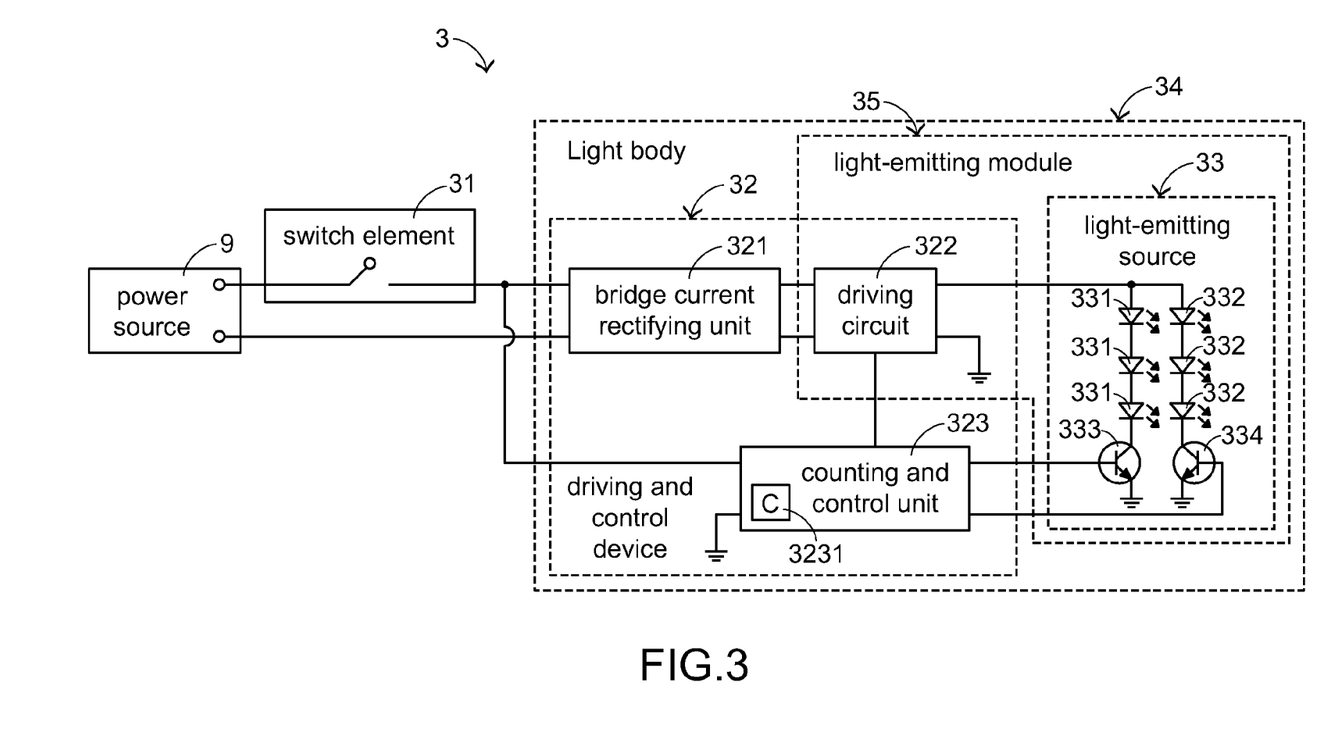
FIG. 3 is a circuit block diagram schematically illustrating a lighting device according to a first embodiment of the present invention.
Figure 4:
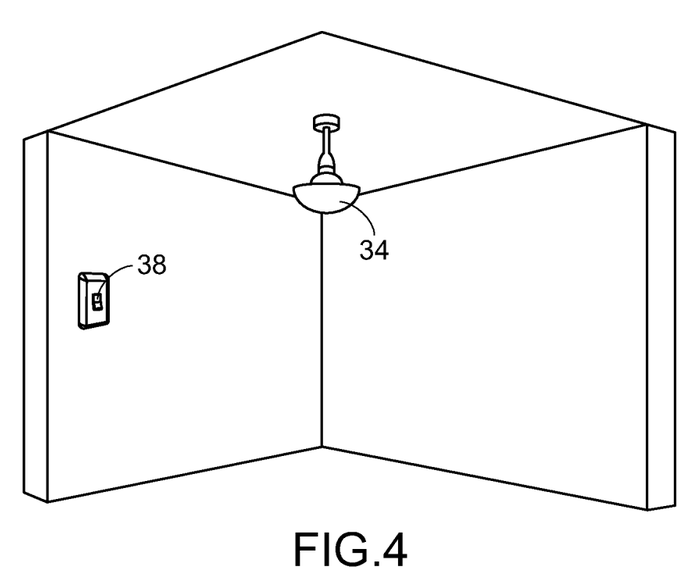
FIG. 4 is a schematic diagram illustrating the use of the lighting device shown in FIG. 3.

Please refer to FIG. 3, which schematically illustrates a lighting device according to a first embodiment of the present invention. The lighting device 3 includes a switch element 31, which is a power supply switch, a driving and control device 32 and a light-emitting source 33. The driving and control device 32 is electrically connected to or wirelessly coupled to the switch element 31 and a light-emitting source 33. When the switch element 31 is switched on, the power source 9 supplies electricity for the driving and control device 32 to drive the light-emitting source 33 so as to provide illumination light. On the other hand, when the switch element 31 is switched off, the power source 9 stops supplying electricity to the driving and control device 32, and thus the light-emitting source 33 becomes extinguished. In this embodiment, the switch element 31 is controlled with a mains switch 38 standing alone on the wall 8. By manipulating the mains switch 38, the switch element 31 can be switched on or off. The driving and control device 32 and the light-emitting source 33 may be, but are not necessarily, two elements disposed inside a light body 34, as shown in FIG. 4. For example, the switch element 31 may be integrated with the light body 34 to form the lighting device 3.

The light-emitting source 33 includes at least a first LED unit 331 emitting light of a first color temperature, a second LED unit 332 emitting light of a second color temperature, a first transistor 333 coupled to the first LED unit 331, and a second transistor 334 coupled to the second LED unit 332. In this embodiment, an example of the light of the first color temperature is cold white light having a color temperature of about 6000K, and an example of the light of the second color temperature is warm white light having a color temperature of about 3000K. Please be noted the implementation of the present invention is not limited to the above-mentioned examples.

In this embodiment, the driving and control device 32 includes a bridge current rectifying unit 321, a driving circuit 322 and a counting and control unit 323, wherein the bridge current rectifying unit 321, for example, is a programmable microcontroller or a flip-flop, and the driving circuit 322 and the light-emitting source 33, for example, can be combined as a driving and light-emitting module 35. Please be noted the implementation of the present invention is not limited to the above-mentioned examples.

When the switch element 31 is switched on, the bridge current rectifying unit 321 converts the alternating current from the power source 9 into direct current, and transmits the direct current to the elements of the driving circuit 322. On the other hand, the counting and control unit 323 directly receives the alternating current from the power source 9, and outputs one or both of a first enable signal and a second enable signal, depending on the receiving times of the alternating current from the power source 9 corresponding to a switching number of the switch element 31. The driving circuit 322 then selectively drives the first LED 331 to emit the light of the first color temperature in response to the first enable signal, and selectively drives the second LED 332 to emit the light of the second color temperature in response to the second enable signal.

The counting and control unit 323 includes a capacitor 3231, which provides power for maintaining the work of the counting and control unit 323 for a certain period of time during the off-state of the switch element 31. The length of the period of time varies with the specification of the capacitor 3231. In other words, if the switch element 31 keeps off for a time period longer than the time period the capacitor 3231 can supply power, the counting and control unit 323 would finally lose power and become unable to execute the counting task until the switch element 31 is switched on. Then the counting of the switching number of the switch element 31 will start over after the switch element 31 is switched on again. Likewise, the counting of the switching number of the switch element 31 will start over when the switch element 31 is in an off state for a time period longer than a preset one.

Figure 5:
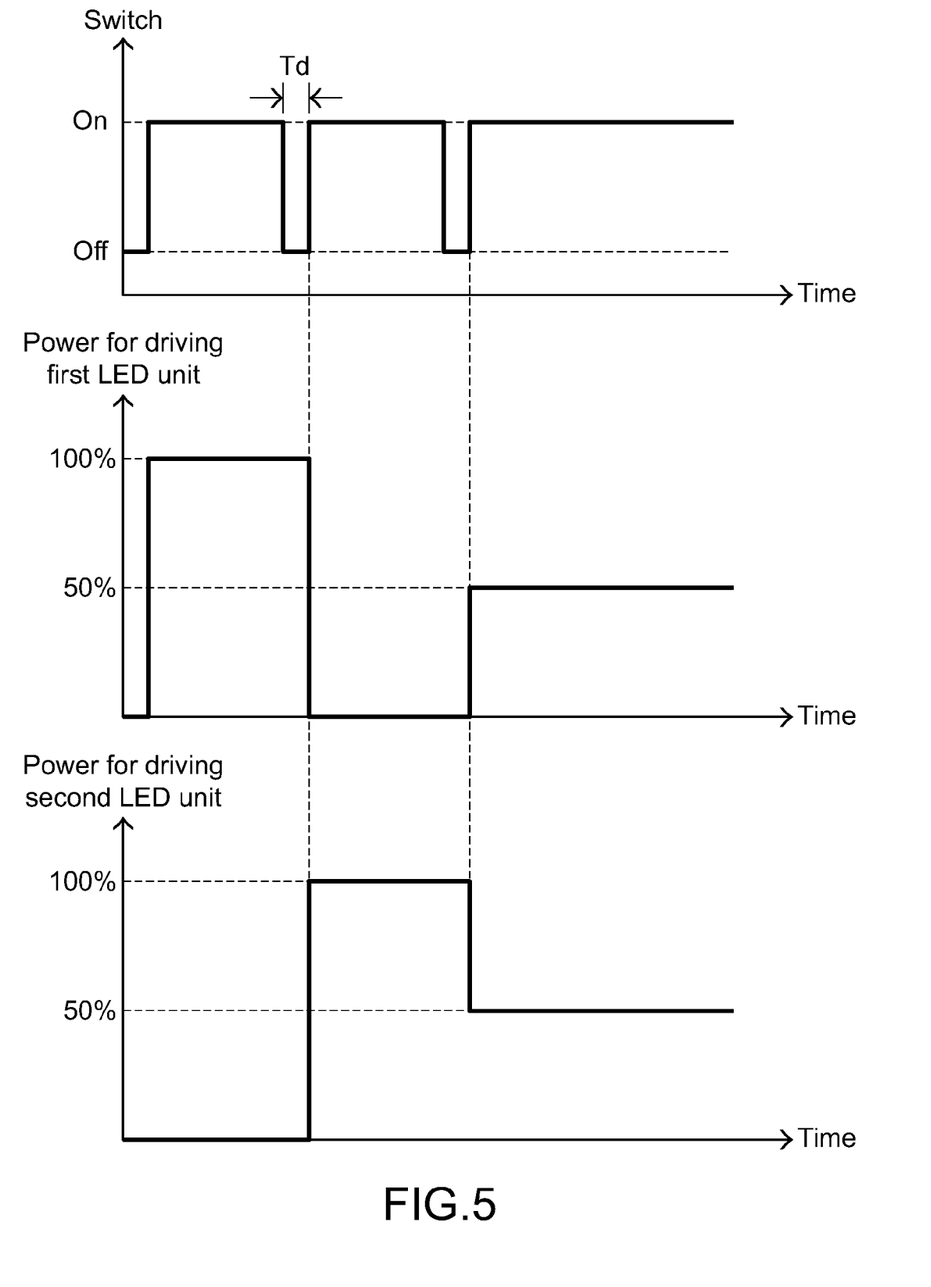
FIG. 5 is a waveform diagram illustrating the operation of the lighting device shown in FIG. 3.

Please refer to FIG. 5, which is a waveform diagram illustrating the operation of the lighting device shown in FIG. 3. The first time the switch element 31 is switched on, the counting and control unit 323 receives the alternating current from the power source 9 for the first time, and generates and outputs the first enable signal to turn on the first transistor 333 so as to have only the first LED unit 331 driven to emit light of the first color temperature with 100% power. Afterwards, the switch element 31 is switched off for a specified period of time Td and then switched on again to receive the alternating current from the power source 9 before the counting and control unit 323 runs out of the power supplied by the capacitor 3231. Meanwhile, the counting and control unit 323 generates and outputs the second enable signal to turn on the second transistor 334 so as to have only the second LED unit 332 driven to emit light of the second color temperature with 100% power.

Subsequently, the switch element 31 is switched off again and then switched on again to receive the alternating current from the power source 9 within the power supply time period of the capacitor 3231. This time, the counting and control unit 323 generates and outputs both the first enable signal and the second enable signal to turn on the first transistor 333 and the second transistor 334, respectively. With the conduction of both the transistors 333 and 334, partial current flows through the first LED unit 331 and the second LED unit 332 so as to have the first LED unit 331 driven to emit the light of the first color temperature with 50% power and have the second LED unit 332 driven to emit the light of the second color temperature with 50% power. As a result, the lighting device emits light of a third color temperature, which is synthesized from the light of the first color temperature and the light of the second color temperature. If the light-emitting elements included in the first LED unit 331, each having a color temperature of 6000K, and the light-emitting elements included in the second LED unit 332, each having a color temperature of 3000K, are distributed in a well mixed manner, the light of the third color temperature will be normal white light having a color temperature of about 4500K.

Figure 6:
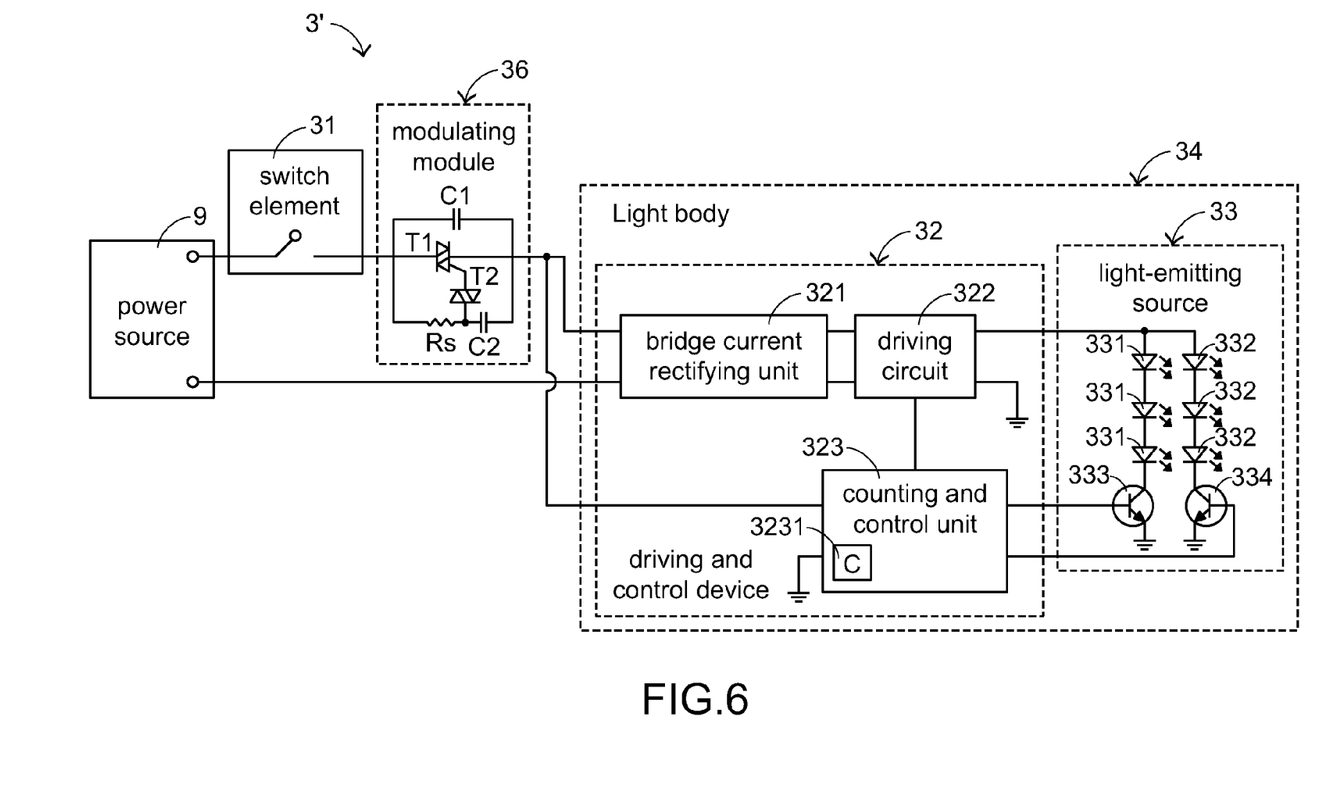
FIG. 6 is a circuit block diagram schematically illustrating a lighting device according to a second embodiment of the present invention.

Please refer to FIG. 6, which is a circuit block diagram schematically illustrating a lighting device according to a second embodiment of the present invention. The lighting device 3' in this embodiment is similar to the light device 3 in the first embodiment except that the lighting device 3' further includes a modulating module 36 coupled to the switch element 31 and the driving and control device 32 for modulating luminance of the light-emitting source 33.

Figure 7:
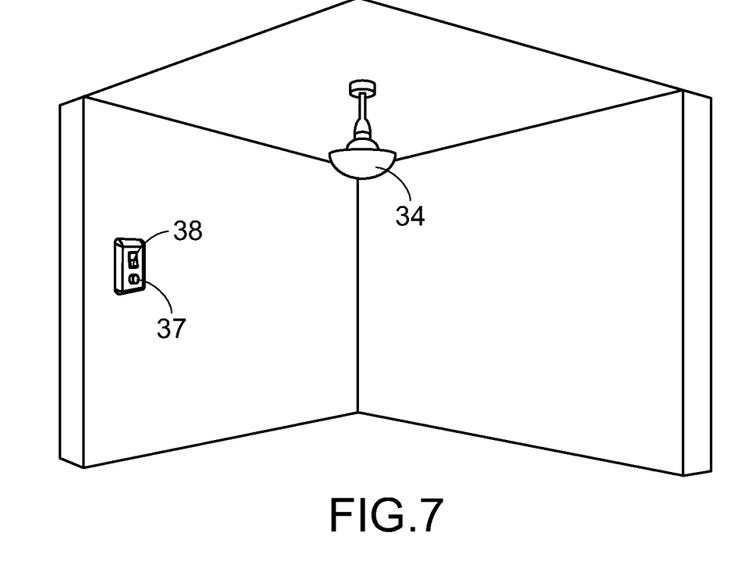
FIG. 7 is a waveform diagram illustrating the operation of the lighting device shown in FIG. 6.

In this embodiment, the modulating module 36 includes a variable resistor Rs, capacitors C1, C2 and bidirectional triode thyristors T1, T2. When the switch element 31 is switched on, the alternating current entering the bridge current rectifying unit 321 from the power source 9 can be modulated by changing the resistance of the variable resistor Rs. In this embodiment, the modulating module 36 is, but not necessarily, manipulated by way of a knob 37 disposed under the mains switch 38, as shown FIG. 7. The knob is coupled to the variable resistor and rotatable to change the resistance of the variable resistor. The bridge current rectifying unit 321 then converts the modulated alternating current into direct current to be transmitted to elements included in the driving circuit 322. Accordingly, the lighting device 3 provides light with luminance corresponding to the resistance of the variable resistor Rs.

Figure 8:
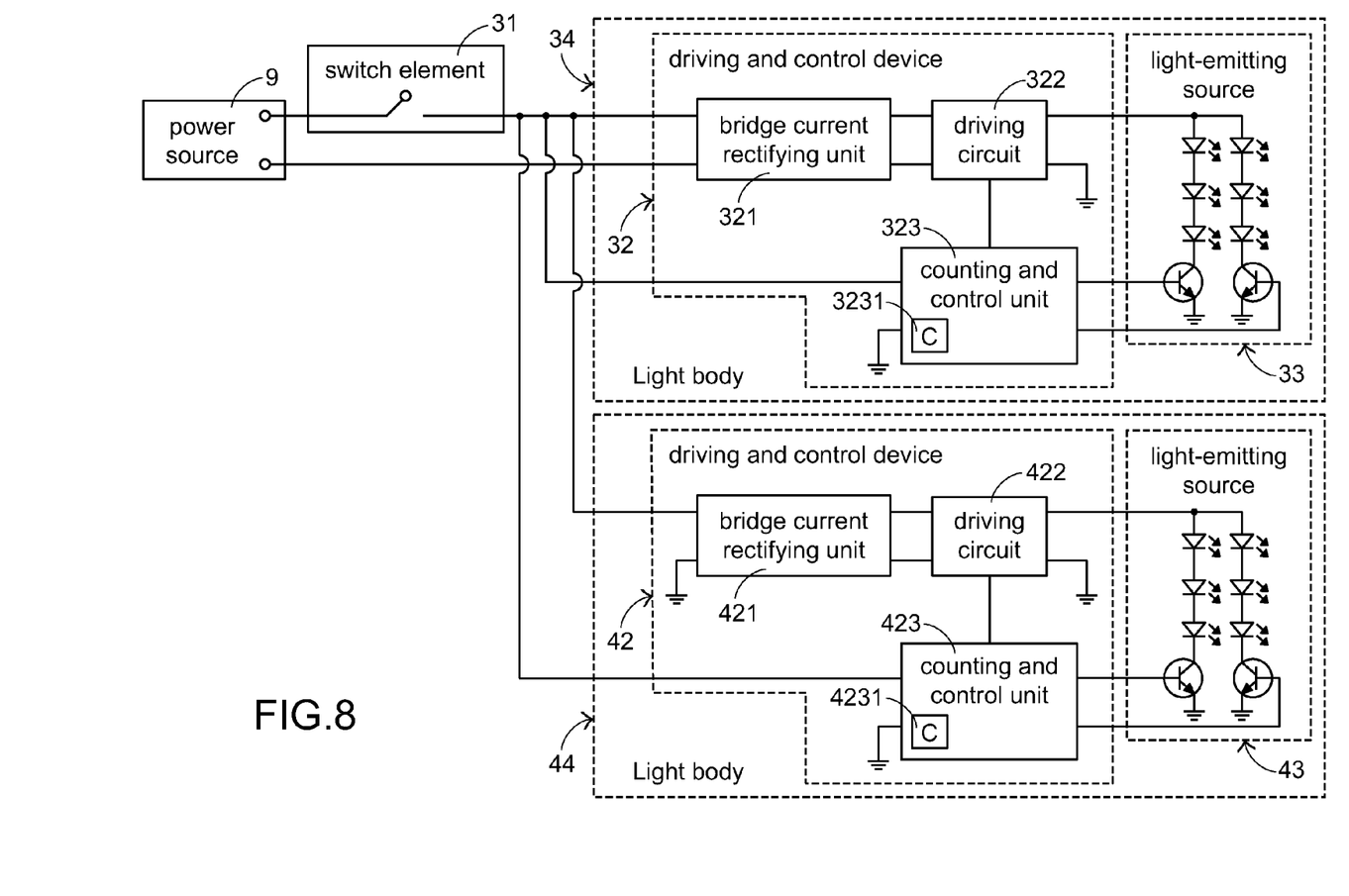
FIG. 8 is a circuit block diagram schematically illustrating a lighting device according to a third embodiment of the present invention.

Please refer to FIG. 8, which is a circuit block diagram schematically illustrating a lighting device according to a third embodiment of the present invention. The common elements included in the lighting device of this embodiment and the lighting device of the first embodiment are not to be redundantly described herein.

Figure 9:
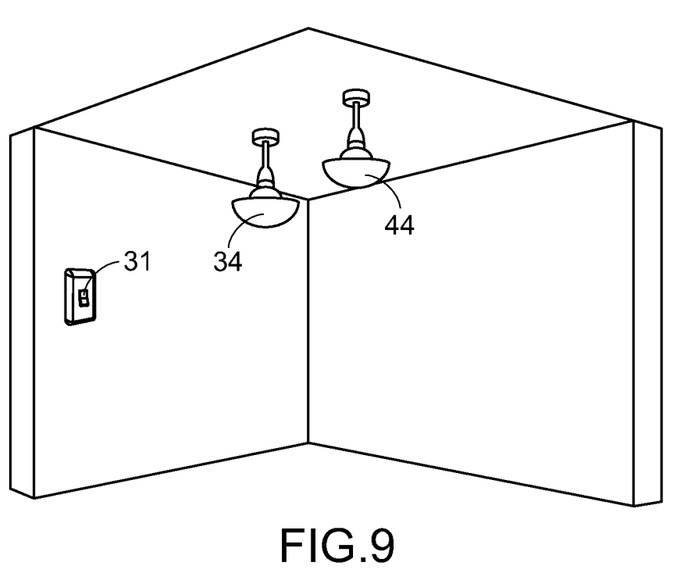
FIG. 9 is a waveform diagram illustrating the operation of the lighting device shown in FIG. 8.

The lighting device of this embodiment differs from the lighting device of the first embodiment in further comprising another bridge current rectifying unit 421, another driving circuit 422, another counting and control unit 423 and another light-emitting source 43. The bridge current rectifying unit 421, driving circuit 422, counting and control unit 423 and light-emitting source 43 work identically to those described in the first embodiment. For example, the counting and control unit 423 is directly coupled to the switch element 31. In this embodiment, the driving circuit 422 and light-emitting source 43 are elements of another light body 44, as shown in FIG. 9. The respective light-emitting sources 33 and 43 of two light bodies 34 and 44 included in the lighting device of this embodiment are controllable with a single switch.

In this embodiment, since the two counting and control units 323 and 423 are both coupled to the switch element 31 and outputs enable signals directly according to the receiving status of the alternating current, the respective light-emitting sources 33 and 43 of two light bodies 34 and 44 emit light synchronously. In other words, by having the two counting and control units 323 and 423 differentially outputs enable signals directly according to the receiving times of the alternating current, the desynchronizing problem encounter by the prior art due to the time variations resulting from inconsistent specifications or manufacturing processes of the elements, e.g. capacitors, included in different light bodies can be avoided.

The above three embodiments are just examples given for better understanding the present invention, and can be modified by those skilled in the art according to practical designs and needs. For example, the modulating module 36 used in the second embodiment can also be added into the lighting device in the third embodiment.

Furthermore, although each of the lighting devices described in the above three embodiments changes color temperatures of light according to the switching-on number of the switch element, it may be modified to have the color temperatures of light changed according to the switching-off number of the switch element without difficulties based on the disclosure as above. For example, when the switch element 31 is first switched on, the driving circuit 322 drives the light-emitting source 33 to emit light of a first luminance in response to the first enable signal generated by the counting and control unit 323; and when the switch element is switched off and then switched on after a specified period of time, the driving circuit 322 drives the light-emitting source 33 to emit light of a second luminance in response to the second enable signal generated by the counting and control unit 323. In another example, when the switch element is first switched on, the lighting device emits light for illumination, and when the switch element is switched off and then switched on after a specified period of time, the lighting device provides a radio frequency identification (RFID) sensing function. Afterwards, when the switch element is switched off again and then switched on again, the lighting device suspends both the illumination and RFID sensing function.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A lighting device, comprising:
   a switch element coupled to a power source;
   a bridge current rectifying unit in communication with the switch element for converting alternating current received from the power source into direct current;
   a driving and light-emitting module in communication with the bridge current rectifying unit; and
   a counting and control unit having one end coupled between the switch element and the bridge current rectifying unit, and another end coupled to the driving and light-emitting module for counting a switching number of the switch element, and selectively outputting one or both of a first enable signal and a second enable signal to the driving and light-emitting module to execute a corresponding function according to the switching number of the switch element.

2. The lighting device according to claim 1, wherein the counting and control unit is a programmable microcontroller or a flip-flop.

3. The lighting device according to claim 1, wherein the counting and control unit starts over the counting of the switching number of the switch element once the switch element is in an off state for a time period longer than a preset time period.

4. The lighting device according to claim 3, wherein the counting and control unit includes a capacitor for power supply to the counting and control unit during the preset time period in order to maintain the work of the counting and control unit during the off state of the switch element.

5. The lighting device according to claim 1, wherein the driving and light-emitting module includes:
   a driving circuit;
   a first LED unit coupled to and driven by the driving circuit for emitting a light of a first color temperature in response to the first enable signal; and
   a second LED unit coupled to and driven by the driving circuit for emitting a light of a second color temperature in response to the second enable signal.

6. The lighting device according to claim 1, wherein the driving and light-emitting module includes:
   a driving circuit; and
   an LED unit coupled to and driven by the driving circuit for emitting a light of a first luminance in response to the first enable signal, and emitting a light of a second luminance in response to the second enable signal.

7. The lighting device according to claim 1, further comprising a modulating module coupled to the driving and light-emitting module for fine-tuning luminance of the emitted light.

8. The lighting device according to claim 7, wherein the modulating module includes a variable resistor and the luminance is changed with resistance of the variable resistor.

9. The lighting device according to claim 8, wherein the modulating module further includes a knob coupled to the variable resistor and rotatable to change the resistance of the variable resistor.

10. A lighting device, comprising:
    a light-emitting source for providing an illumination light;
    a switch element coupled to a power source; and
    a driving and control device in communication with the switch element and the light-emitting source for counting a switching number of the switch element, and selectively outputting one or both of a first enable signal and a second enable signal to the driving and light-emitting module to execute a corresponding function according to the switching number of the switch element,
    wherein the driving and control device starts over the counting of the switching number of the switch element once the switch element is in an off state for a time period longer than a preset time period, and the driving and control device includes a capacitor for power supply to the counting and control unit within the preset time period in order to maintain the work of the counting and control unit durin the off state of the switch element.

11. The lighting device according to claim 10, wherein the driving and control device includes a bridge current rectifying unit in communication with the switch element for converting alternating current received from the power source into direct current to be transmitted to the driving and control device.

12. The lighting device according to claim 11, wherein the counting and control unit is a programmable microcontroller or a flip-flop.

13. The lighting device according to claim 10, wherein the driving and control device includes:
    a driving circuit in communication with the light-emitting source; and
    a counting and control unit having one end coupled between the switch element and the bridge current rectifying unit and another end coupled to the driving circuit, and counting the switching number of the switch element, and selectively outputting one or both of the first enable signal and the second enable signal to the driving and light-emitting module to execute the corresponding function according to the switching number of the switch element.

14. The lighting device according to claim 10, wherein the light-emitting source includes:
    a first LED unit coupled to and driven by the driving and control device for emitting the illumination light with a first color temperature in response to the first enable signal; and
    a second LED unit coupled to and driven by the driving and control device for emitting the illumination light with a second color temperature in response to the second enable signal.

15. The lighting device according to claim 10, wherein the light-emitting source includes an LED unit, and the driving and light-emitting module drives the LED unit to emit the illumination light with a first luminance in response to the first enable signal, and emitting the illumination light with a second luminance in response to the second enable signal.

16. The lighting device according to claim 10, further comprising a modulating module coupled to the light-emitting source for fine-tuning luminance of the illumination light.

17. The lighting device according to claim 16, wherein the modulating module includes a variable resistor and the luminance is changed with resistance of the variable resistor.

18. The lighting device according to claim 17, wherein the modulating module further includes a knob coupled to the variable resistor and rotatable to change the resistance of the variable resistor.

19. A lighting device, comprising a mains switch and at least a first light body and a second light body commonly coupled to and controlled by the mains switch, each of the first and second light bodies comprising:
- a bridge current rectifying unit in communication with the mains switch for converting alternating current from a power source into direct current;
- a driving and light-emitting module in communication with the bridge current rectifying unit; and
- a counting and control unit having one end coupled between the mains switch and the bridge current rectifying unit and having another end coupled to the driving and light-emitting module for counting a switching number of the mains switch, and selectively outputting one or both of a first enable signal and a second enable signal to the driving and light-emitting module to execute a corresponding function according to the switching number of the switch element.

20. The lighting device according to claim 19, wherein the counting and control unit selects to output the first enable signal and/or the second enable signal according to a switching-on number of the mains switch, which is realized by counting an alternating-current receiving number from the power source.

21. The lighting device according to claim 19, wherein the counting and control unit starts over the counting of the switching-on number of the mains switch once the mains switch is in an off state for a time period longer than a preset time period, and the counting and control unit includes a capacitor for power supply to the counting and control unit during the preset time period in order to maintain the work of the counting and control unit during the off state of the mains switch.

\* \* \* \* \*